United States Patent [19]

Klomp

[11] 4,309,966
[45] Jan. 12, 1982

[54] ECCENTRIC, OSCILLATING INTAKE VALVE

[75] Inventor: Edward D. Klomp, Mt. Clemens, Mich.

[73] Assignee: General Motors Corporation, Detroit, Mich.

[21] Appl. No.: 132,102

[22] Filed: Mar. 20, 1980

[51] Int. Cl.³ .................................................. F01L 1/32
[52] U.S. Cl. .......................... 123/90.28; 123/188 AA; 123/306
[58] Field of Search ................ 123/81 R, 81 B, 90.28, 123/90.29, 90.30, 188 M, 188 R, 306, 188 AA, 188 AP, 188 A; 251/229

[56] References Cited

U.S. PATENT DOCUMENTS

| | | | |
|---|---|---|---|
| 1,160,028 | 11/1915 | Wright | 123/188 R |
| 1,528,193 | 3/1925 | Buck | 123/90.28 |
| 1,550,530 | 8/1925 | Flynn et al. | 123/90.28 |
| 1,610,409 | 12/1926 | Anthony | 123/90.28 |
| 2,874,686 | 2/1959 | Carey, Jr. | 123/81 R |
| 3,090,370 | 5/1963 | Kimball | 123/90.28 |
| 3,875,921 | 4/1975 | De Boy et al. | 123/188 R |
| 3,878,825 | 4/1975 | Klomp | 123/188 M |
| 4,164,209 | 8/1979 | Grants | 123/188 M |

*Primary Examiner*—Craig R. Feinberg
*Assistant Examiner*—W. R. Wolfe
*Attorney, Agent, or Firm*—Arthur N. Krein

[57] ABSTRACT

In order to improve volumetric efficiency and to encourage swirling flow inside a combustion chamber of a reciprocating engine, an intake valve is provided having its stem located eccentrically with respect to the head of the valve. The valve stem guide bore in the cylinder head of the engine is correspondingly located to one side of the axis of the intake port and, preferably, toward the center of the combustion chamber. In addition, drive means are associated with the valve whereby it is oscillated about the axis of the stem so as to bias the flow area, upon opening movement of the valve, in a direction so as to direct an induction charge into the combustion chamber in a flow direction substantially tangential to the cylinder wall.

3 Claims, 4 Drawing Figures

ECCENTRIC, OSCILLATING INTAKE VALVE

FIELD OF THE INVENTION

This invention relates to valves for reciprocating internal combustion engines and, in particular to an intake valve which is operable so as to create a high swirling motion to an induction charge flowing into a combustion chamber of an engine.

BACKGROUND OF THE INVENTION

Intake or induction valves for internal combustion engines are normally of the poppet type valve. Each such poppet valve includes an annular head adapted to seat against a valve seat in the cylinder head of the engine to control the flow of induction fluid through an intake passage in the cylinder head to a cylinder of the engine during the induction cycle for that cylinder. Normally the annular head of such a poppet valve is constituted as a body of revolution about an axis and is provided with a stem extending therefrom which is co-axial with this axis. The stem of the poppet valve is reciprocably journaled in a suitable valve stem guide bore provided in the cylinder head. The free end of the stem of the valve normally projects from the cylinder head a suitable distance so that it can be engaged by a suitable actuator means, such as a rocker arm, whereby to effect reciprocating movement of the poppet valve in an opening direction. A valve return spring is used to effect reciprocating movement of the poppet valve in an opposite or valve closing direction.

In such a conventional poppet type valve, when the head is unseated from the valve seat, a uniform annular flow area is provided between the valve head and the inlet port for the flow of induction fluid into the combustion chamber for that cylinder of the engine. With such an arrangement, induction fluid flow is substantially uniform around the head of the valve and, accordingly, depending on the location of the inlet port relative to the longitudinal axis of the cylinder, there is little or no swirling motion of the induction fluid entering the cylinder around the longitudinal axis of the cylinder.

Because of this, various means have been used in the prior art to promote swirl of the induction fluid on entry into the combustion chamber, such as for example, by the use of a shrouded valve or a swirl port. By way of an example, by providing the outer surface of the valve guide in the inlet port with suitable shaped ribs or vanes, induction fluid entering the cylinder from this port is given a direction of flow which, in general, is in the desired direction of induction fluid flow rotation around the axis of the cylinder. However, it has been found that whether a shrouded valve or a swirl port is used to introduce swirl, the use of such a swirl inducing device can effect a reduction in the volumetric efficiency of the engine.

SUMMARY OF THE INVENTION

The present invention relates to an intake valve that is operative so as to improve volumetric efficiency and to encourage swirling inside a combustion chamber of a reciprocating internal engine. The intake valve in accordance with the invention includes a circular valve head with a stem extending therefrom eccentrically with respect to the axis of the valve head. With this construction of the intake valve, the usual valve stem guide bore in the cylinder head of the engine is located parallel to and on one side of the axis of the intake port, toward the center of the associated combustion chamber. In addition, means are associated with the cylinder head and the stem of the valve to effect oscillation of the valve about the axis of its stem so as to shift the opening flow area between the valve head and the inlet port whereby an induction charge is introduced into a combustion chamber in a direction to enhance the swirl generation potential of an otherwise conventional intake port structure.

Accordingly, the principal object of this invention is to provide an improved poppet type, intake valve that is operative in a manner whereby swirl may be introduced into the combustion chamber of an internal combustion engine when the intake valve is actuated while at the same time permitting substantially unrestricted flow of an induction charge into the combustion chamber.

Another object of the invention is to provide an improved intake valve for use in the intake port of an engine induction system, the intake valve, upon actuation thereof, being operative in a manner whereby the head thereof is pivoted away from the intake port so as to provide a flow passage having a high flow coefficient while at the same time providing a flow path so that swirl is introduced into the combustion chamber.

A further object of this invention is to provide a poppet type, intake valve having a valve stem offset relative to the axis of the valve head whereby when the valve stem is reciprocated in a straight line motion and at the same time is pivoted, the valve head will have both vertical and horizontal components of motion relative to the valve seat in the inlet port to the cylinder of an engine.

These and other objects of the invention are obtained by a poppet type, intake valve in which the valve head thereof is formed as a body of revolution about an axis and with the stem of the valve offset a predetermined distance relative to this axis. The valve stem guide bore in a cylinder head is accordingly, offset a corresponding distance to one side of the axis of an associated intake port with which the intake valve is to cooperate. Cooperating means are associated with both the cylinder head and the stem of the intake valve so that upon reciprocation of the valve stem oscillating movement will also be imparted to the valve head.

BRIEF DESCRIPTION OF THE DRAWING

For a better understanding of the invention, as well as other objects and further features thereof, reference is had to the following detailed description of the invention to be read in connection with the accompanying drawings, wherein.

DESCRIPTION OF THE PREFERRED EMBODIMENTS

Figure 1:
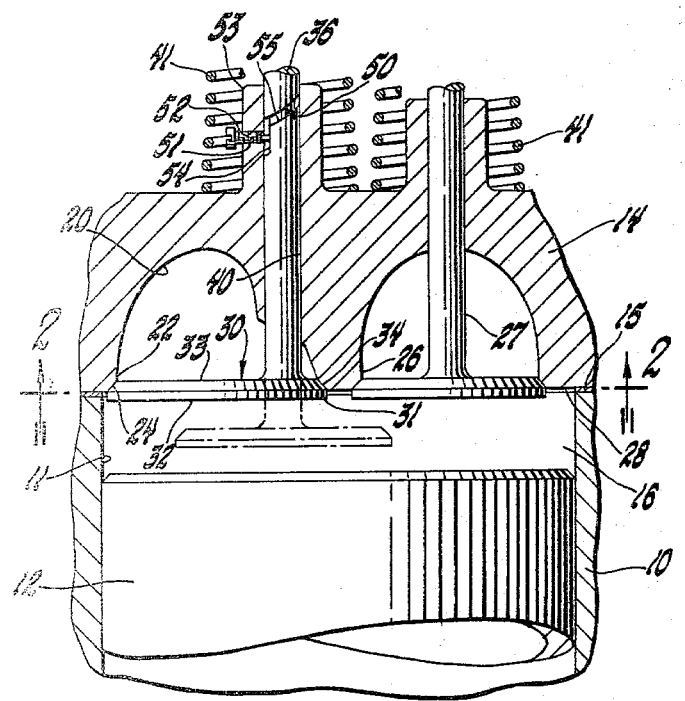
FIG. 1 is a cross-sectional view of a portion of an internal combustion engine having an intake valve, constructed in accordance with the invention and shown in elevation, positioned to control the flow of induction fluid to a combustion chamber of the engine, and having preferred embodiment of a drive means to effect oscillation of the intake valve.

Referring now to the drawings, there is illustrated a portion of an internal combustion engine having an engine cylinder block 10 with at least one cylinder 11 therein defined by an internal cylindrical bore wall formed in the cylinder block. The cylinder 11 reciprocably receives a piston 12. Closing the end of the cylinder is a cylinder head 14 that is suitably secured to the cylinder block 10 with the usual gasket 15 sandwiched therebetween. The cylinder 11, piston 12 and cylinder head 14 cooperate to define a variable volume combustion chamber 16.

Figure 2:
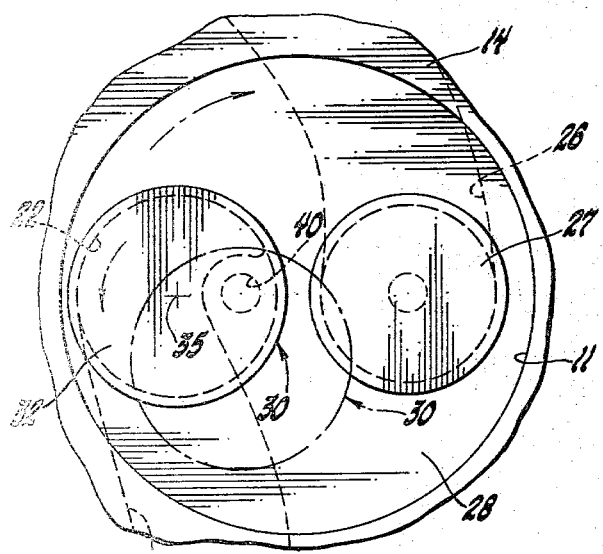
FIG. 2 is a cross-sectional view of a portion of the engine of FIG. 1 taken along line 2—2 of FIG. 1.

As shown in FIG. 1, the cylinder head 14 is provided with an induction system that includes an induction passage 20 which would have the usual entrance portion at its upstream end opening from an outer surface (not shown) of the cylinder head 14 which is adapted to receive an inlet manifold (not shown). At its opposite end, the inlet passage terminates at an annular inlet or intake port 22 opening into the combustion chamber 16, with flow therefrom controlled by an intake valve 30 in accordance with the invention. Induction passage 20, as is well known, is suitably curved in its longitudinal direction, as desired at least adjacent to the inlet port end thereof to change the direction of induction flow therethrough for unrestricted flow out through the inlet port, as shown in FIG. 2.

Intake port 22 presents an annular valve seat 24 which, in a conventional manner, is chamfered or beveled at a suitable angle to the axis of the intake port, as desired, on the side of the cylinder head 14 adjacent to the cylinder block 10.

Cylinder head 14 is also provided with an exhaust passage that opens at an exhaust port 26 into the cylinder 11 with an exhaust valve 27 controllably closing the exhaust port 26 end which opens through the firing face 28 of the cylinder head.

Referring now to the intake valve 30 of the invention, this valve includes a head 31, formed as a body of revolution about an axis, with a face 32 on one side thereof, which in the embodiment illustrated is flat, and a valve back 33 on its other side. The outer peripheral rim of the valve head 31 is provided with an annular beveled seating portion 34 adapted to seat against the valve seat 24 in the annular inlet port 22 of the cylinder head 14. The axis of the valve head 31 when thus seated against the valve seat 24 is co-axial with the axis 35 of the inlet port 22, FIG. 2.

The intake valve 30 further includes a valve stem 36 which extends up from the back 33 of the valve head 31, which stem 36, in accordance with the invention, is offset, a predetermined distance, radially outward on the head 31 from the axis of the head. As is well known, in a conventional, prior art, poppet type valve, the stem thereof extends concentrically from the valve and thus its axis is co-axial with the axis of the valve head.

Figure 3:
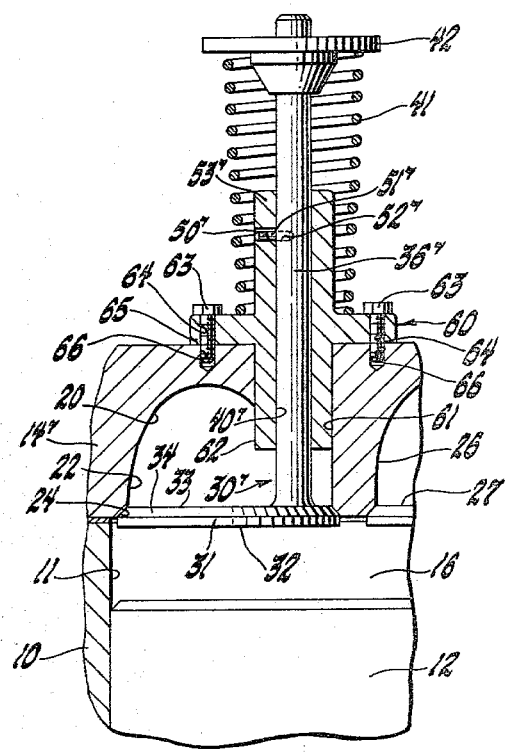
FIG. 3 is a cross-sectional view of a portion of an engine, similar to that shown in FIG. 1, showing an alternate drive means for effecting oscillation of an intake valve in accordance with the invention.

As shown in FIG. 1, the stem 36 is reciprocably journaled in a suitable stem guide bore 40 which can be provided in the cylinder head 14 as shown in FIG. 1, or it can be provided in a separate valve stem guide that is suitably secured to the cylinder head, as well known in the art and as shown in the embodiment illustrated in FIG. 3.

Now, in accordance with the invention since the valve stem 36 of the intake valve 30 is offset radially a predetermined distance from the axis of the head thereof, the stem guide bore 40 is located a correspondingly equal distance to one side of the axis 35 of the annular intake port 22. Preferably, as shown in FIGS. 1 and 2, the axis of this valve stem guide bore 40 for the intake valve 30 is located toward the center of the associated cylinder 11.

The stem 36 of the intake valve 30 extends outward a suitable distance from the cylinder head 14 so as to permit actuation thereof in one axial direction by means of, for example, a rocker arm, not shown, engaging the free end of the stem. Axial movement of the valve stem 36 and therefore of the intake valve 30 in the opposite direction is effected by means of a coil spring 41 encircling the stem. As is conventional, one end of this coil spring 41 abuts against the cylinder head 14 and the other end engages against a valve spring retainer cap, such as the spring retainer cap 42 shown in FIG. 3, that is suitably locked adjacent to the free end of the valve stem, in a known manner.

In addition, in accordance with the invention, suitable drive means are associated with both the cylinder head 14 and with the intake valve 30 to effect oscillating movement of the head 31 of the intake valve 30 during reciprocating movement thereof.

Thus with reference to the embodiment shown in FIG. 1, the drive means for effecting oscillation of the intake valve 30 includes a suitable cam groove 50 formed in the valve stem 36 intermediate the ends thereof. This cam groove 50 is located so as to coact with a suitable stationary follower, such as the follower pin 51 suitably fixed in a radial aperture 52, provided for this purpose in the valve stem guide boss 53 of the cylinder head 14. In the construction illustrated, follower pin 51 is provided with an externally threaded shank portion and the aperture 52 is provided with internal threads. The follower pin 51 is positioned in the radial aperture 52 so that its inboard end projects into the cam groove 50 a suitable distance for sliding engagement with the cam side walls thereof.

The cam groove 50 in the valve stem 36, in the particular embodiment illustrated in FIG. 1, includes a straight portion 54 defined by opposed spaced apart parallel side walls extending axially of the valve stem 36 and a suitable helical portion 55 defined by opposed spaced apart side walls cam surface of a desired configuration, angle and hand to effect the desired degrees of pivotable movement of the valve head 31 for a particular valve lift during operation of the intake valve 30.

Thus with reference to this embodiment, as the intake valve 30 is opened and closed, in the conventional fashion, it will also be forced to oscillate about the axis of valve stem 36 by the helical portion 55 of cam groove 50 cooperating with the fixed follower pin 51. With the arrangement of the cam groove 50 as shown, during initial opening movement of the intake valve 30 the head 31 will first move axially downward so as to effect unseating of its seating portion 34 relative to the valve seat 24. Then, as the helical portion 55 of the cam groove 50 coacts with the follower pin 51, the head 31 will be caused to move in a counterclockwise direction, with reference to FIG. 2, away from the inlet port 22 opening, for the helix hand shown. As this occurs, the head 31 will have both axial and angular movement relative to the inlet port 22 so that when the valve head 31 is at a fully open position, valve head 31 will be positioned relative to the inlet port 22 as shown in broken lines in FIGS. 1 and 2.

When the valve head 31 is thus moved to its fully opened position relative to the inlet port 22 there is thus provided an induction flow opening that is substantially half moon shaped on one side of the inlet port as best seen in FIG. 2. With this arrangement shown, as seen in FIG. 2, an induction charge flowing into the combustion chamber 16 of associated cylinder 11 will be directed so as to flow substantially tangential to the internal cylindrical wall of cylinder 11 whereby this induction charge will have a substantially swirling motion imparted thereto within the combustion chamber 16. Thus with reference to the embodiment shown in FIGS. 1 and 2, this induction charge will swirl in a clockwise direction, with reference to FIG. 2, in the combustion chamber 16, that is, in a direction opposite to the opening pivotal movement of the valve head 31.

During closing movement of the intake valve 30, the head 31 will again be rotated and advanced axially relative to the inlet port 22, but now in a valve closing direction, as the follower pin 51 rides in the helical portion 55 of cam groove 50 until the valve head 31 is again aligned co-axial with the inlet port. As this occurs, the follower pin 51 becomes engaged in the straight portion 54 of the cam groove 50 so that thereafter the head will no longer rotate but can only be moved axially relative to the inlet port until the seating portion 34 of the valve head again engages the valve seat 24.

Figure 4:
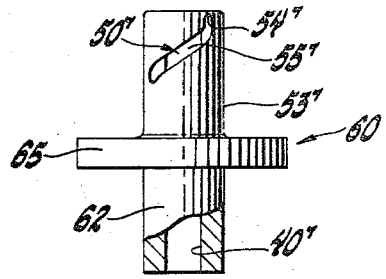
FIG. 4 is a side elevational view with part broken away of the valve stem guide per se, of FIG. 3.

An alternate embodiment of a drive means for effecting oscillation of the intake valve 30', is shown in FIGS. 3 and 4, wherein similar parts are designated by similar numerals, but with the addition of a prime (') where appropriate.

In this alternate embodiment and as shown in FIG. 3, the follower pin 51' is suitably fixed, as by a press fit, in a radial aperture 52' formed in the valve stem 36' of intake valve 30'. The follower pin 51' is axially positioned on the valve stem 36' so as to cooperate with a suitable cam groove 50' which is formed as a radial through slot in the wall of the upper guide boss 53' of a valve stem guide 60. As shown, the valve stem guide 60 is formed as a separate element which is then suitably fixed to the cylinder head 14' whereby the stem guide bore 40' therethrough is offset radially of the axis of the annular intake port 22. For this purpose, the cylinder head 14' is provided with a through bore 61 appropriately located so as to receive the lower cylindrical boss portion 62 of the valve stem guide 60.

In the construction illustrated in FIG. 3, the valve stem guide 60 is fixed to the cylinder head 14' by threaded fasteners 63 which extend through apertures 64 in the base flange portion 65 of valve stem guide 60 for engagement in suitable internally threaded apertures 66 provided for this purpose in the upper surface of the cylinder head 14'.

In this embodiment and as best seen in FIG. 4, the cam groove 50' is similar to cam groove 50 and thus it includes a straight portion 54' extending parallel to the axis of the stem guide bore 40' and a suitable helical portion 55'.

As will be apparent to those skilled in the art, the follower guide pin 51, 51' and cam groove 50, 50' are respectively appropriately located and orientated with respect to the axis of the intake port 22 whereby to obtain the desired movement of the intake valve 30, 30' described hereinabove.

Thus for example in the construction illustrated in FIG. 3, this orientation has been obtained by locating the follower pin 51' on the valve stem 36' so that it extends radially outward toward the axis of the valve head 31, that is, so that an extension of the axis of the follower pin 51' would intersect the axis of the valve head 41. The valve stem guide would have at least one of the through apertures 64 therein properly located angularly relative to the straight portion 54' of the cam groove 50'. Accordingly, a corresponding threaded aperture 66 in the cylinder head 14' would then also be identified as an associated locating aperture that has properly been located relative to, for example, a vertical plane extending through the axis of the intake port 22, with reference to FIG. 3, whereby when the valve stem guide 60 is fixed thereon, the desired orientation of the straight portion 54' will have been obtained.

The associated valve spring 41 for an intake valve 30, 30' while performing its usual function will also assist in assuring that continuous contact is maintained by the follower pin in its associated cam groove. In addition, by proper selection of the hand of the coil valve return spring 41 relative to the hand of the helical portion of a cam groove, the inherent turning characteristics of such a coil spring can be utilized to enhance the pivotable movement of the valve head first in one direction as the spring is compressed and then in the opposite direction as the spring expands during the respective opening and closing movements of the intake valve.

The embodiments of the invention in which an exclusive property or privilege is claimed are defined as follows:

1. A valve controlled induction system for supplying an induction charge into the combustion chamber of an internal combustion engine, the combustion chamber being defined in part by a cylinder of the engine and by a piston reciprocable therein; said valve control induction system including a cylinder head having an induction passage therein terminating at an annular beveled valve seat defining an inlet port to the combustion chamber on the combustion side of said cylinder head and closely adjacent to the internal bore wall of the cylinder; a through stem guide bore in said cylinder head, the axis of said stem guide bore being offset a predetermined distance relative to the axis of said inlet port; an intake valve having a valve stem and a valve head, said valve head being constituted as a body of revolution about an axis, said valve head having a valve seating portion adjacent to one side thereof, said valve stem extending upward from said one side of said valve head with the axis of said valve stem offset relative to the axis of said valve head a distance corresponding to the offset axis of said stem guide bore relative to said axis of said inlet port, said valve stem being substantially simultaneously rotatably and reciprocably journaled in said stem guide bore with one end thereof extending above said cylinder head for actuation thereof; and, pivot drive means operatively associated with said cylinder head and said valve stem to effect oscillating movement of said valve stem and therefore of said valve head as said intake valve is moved between a closed position and an open position relative to the said valve seat via both pivoting and longitudinal spacing thereto upon reciprocation of said valve stem.

2. A valve controlled induction system for supplying an induction charge into the combustion chamber of an internal combustion engine, the combustion chamber being defined in part by a cylinder of the engine and by a piston reciprocable therein; said valve control induction system including a cylinder head having an induction passage therein terminating at an annular beveled valve seat defining an inlet port to the combustion chamber on the combustion side of said cylinder head and closely adjacent to the internal bore wall of the cylinder; a through stem guide bore in said cylinder head, the axis of said stem guide bore being offset a predetermined distance relative to the axis of said inlet port; and intake valve having a valve stem and a valve head, said valve head being constituted as a body of revolution about an axis, said valve head having a valve seating portion adjacent to one side thereof, said valve stem extending upward from said one side of said valve head with the axis of said valve stem offset relative to the axis of said valve head a distance corresponding to the offset axis of said stem guide bore relative to said axis of said inlet port; said valve stem being stubstantially simultaneously rotatably and reciprocably journaled in said stem guide bore with one end thereof extending above said cylinder head for actuation thereof; and, pivot drive means including a follower pin operatively connected to said cylinder head and a cam groove in said valve stem engaged by said follower pin to effect oscillating movement of said valve stem and therefore of said valve head as said intake valve is moved between a closed position and an open position relative to the said valve seat via both pivoting and longitudinal spacing thereto upon reciprocation of said valve stem.

3. A valve controlled induction system for supplying an induction charge into the combustion chamber of an internal combustion engine, the combustion chamber being defined in part by a cylinder of the engine and by a piston reciprocable therein; said valve control induction system including a cylinder head having an induction passage therein terminating at an annular beveled valve seat defining an inlet port to the combustion chamber on the combustion side of said cylinder head and closely adjacent to the internal bore wall of the cylinder; a through stem guide bore in said cylinder head, the axis of said stem guide bore being offset a predetermined distance relative to the axis of said inlet port; an intake valve having a valve stem and a valve head, said valve head being constituted as a body of revolution about an axis, said valve head having a valve seating portion adjacent to one side thereof, said valve stem extending upward from said one side of said valve head with the axis of said valve stem offset relative to the axis of said valve head a distance corresponding to the offset axis of said stem guide bore relative to said axis of said inlet port; said valve stem being substantially simultaneously rotatably and reciprocably journaled in said stem guide bore with one end thereof extending above said cylinder head for actuation thereof; and, pivot drive means including a cam groove means operatively associated with said cylinder head in communication with said stem guide bore and a follower pin connected and engaged in said cam groove so as to effect oscillating movement of said valve stem and therefore of said valve head as said intake valve is moved between a closed position and an open position relative to the said valve seat via both pivoting and longitudinal spacing thereto upon reciprocation of said valve stem.

* * * * *